No. 650,151.  
R. S. LAWRENCE.  
WATER HEATER.  
(Application filed July 31, 1899.)  
(No Model.)  
Patented May 22, 1900.  
2 Sheets—Sheet 1.
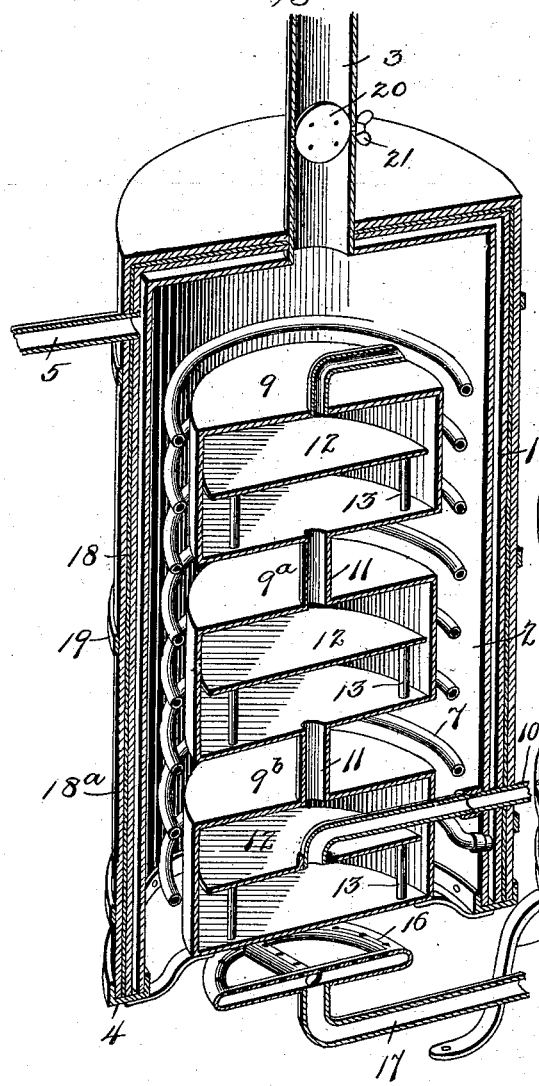
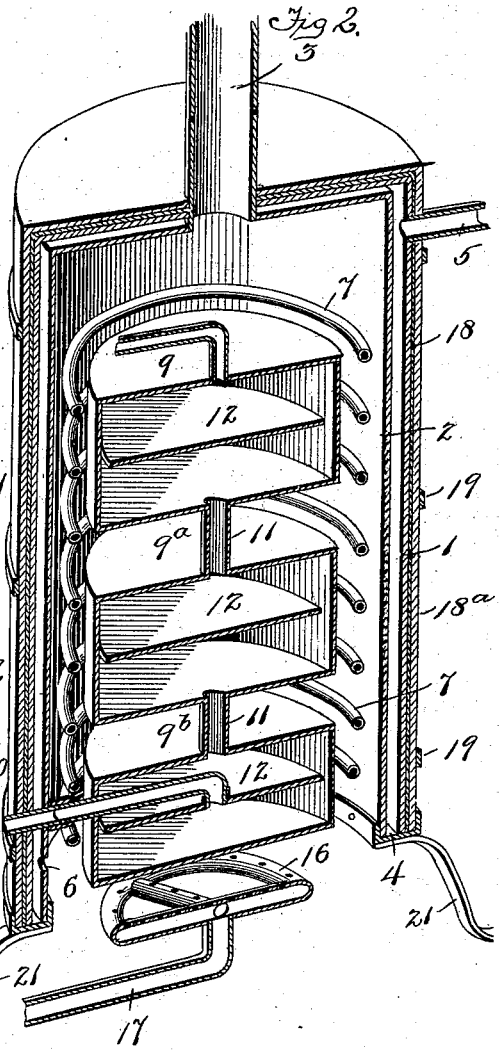
Witnesses  
F. L. McCabe  
Fred Bradford.
Inventor  
Robert S. Lawrence  
By A. Deane & Son  
Attorneys No. 650,151. Patented May 22, 1900.
R. S. LAWRENCE.
WATER HEATER.
(Application filed July 31, 1899.)
(No Model.) 2 Sheets—Sheet 2.
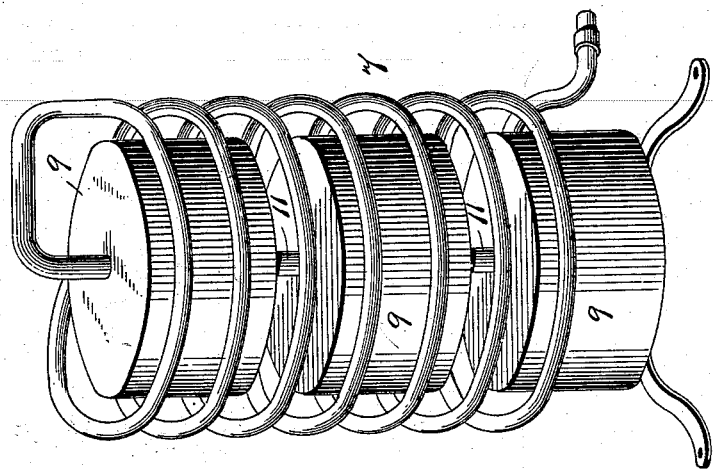
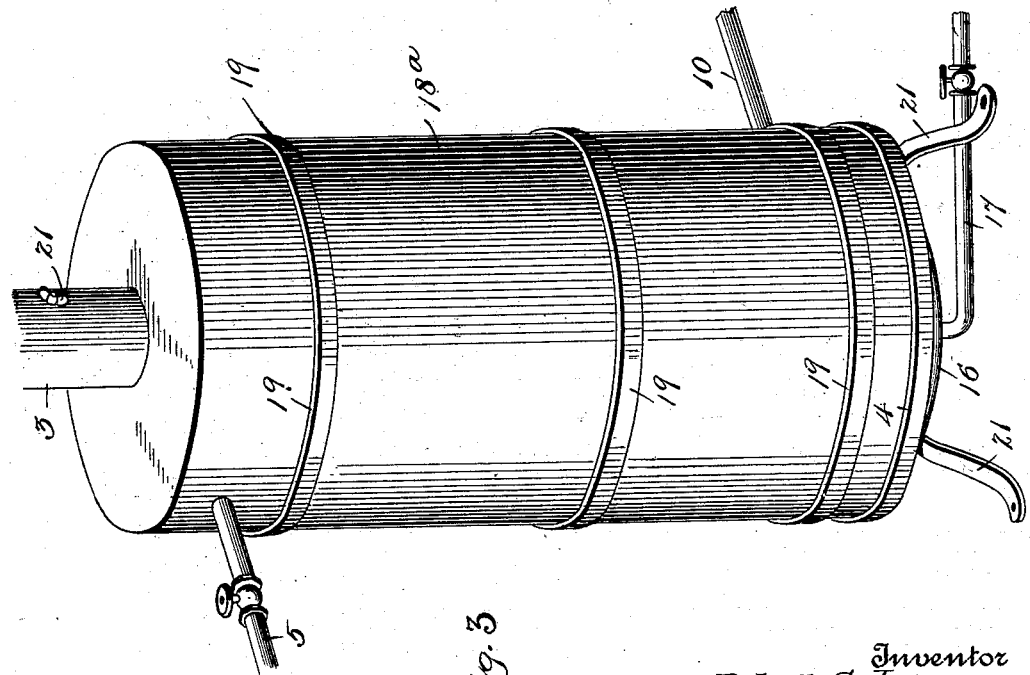
Witnesses
T. L. Mockabee
Fred Bradford.
Inventor
Robert S. Lawrence
By L. Deane & Son
Attorneys

UNITED STATES PATENT OFFICE.

ROBERT S. LAWRENCE, OF WASHINGTON, DISTRICT OF COLUMBIA.

WATER-HEATER.

SPECIFICATION forming part of Letters Patent No. 650,151, dated May 22, 1900.

Application filed July 31, 1899. Serial No. 725,606. (No model.)

*To all whom it may concern:*

Be it known that I, ROBERT S. LAWRENCE, a citizen of the United States, residing at Washington, in the District of Columbia, have invented certain new and useful Improvements in Water-Heaters, of which the following is a specification, reference being had therein to the accompanying drawings.

My invention relates to water-heaters, the primary object being to provide an apparatus of this character which will be adapted especially for domestic use, so that hot water for bathing or other purposes may be obtained quickly and conveniently.

The construction and characteristic features of my invention will be fully described hereinafter and defined in the appended claims, in connection with the accompanying drawings, which form a part of this specification, and in which—

Figures 1 and 2 are central vertical sectional perspective views of my heater. Fig. 3 is a perspective view of the same, and Fig. 4 is a perspective view of the pans and coil.

The reference-numerals 1 and 2 designate, respectively, an outer and an inner cylindrical casing constituting a water-jacket, each formed with a central opening at its upper end to receive a pipe 3, which serves as an escape-flue, as will be referred to hereinafter. The two cylinders are connected at their lower ends by a flanged annulus 4, bolted to the cylinders, so that the outer cylinder 1 constitutes a jacket for the cylinder 2, which is the containing vessel of the apparatus.

The numeral 5 designates an inlet-pipe for supplying water to the annular water-space between the cylinders, and the numeral 6 refers to an opening in the inner cylinder, through which the water passes to the lower end of a heating-coil 7. This coil is spirally arranged within the cylinder 2 and terminates in the upper pan or receptacle 9, which latter is the uppermost of a series of compartments 9, 9ª, and 9ᵇ, through which the heated water must pass before reaching its discharge-spout 10, leading from the lower pan 9ᵇ.

While the number of heating pans or receptacles may be varied, I have shown in the drawings three pans or receptacles connected by connecting-pipes 11.

Within each of the pans or receptacles is arranged a deflector 12, supported by legs 13, projecting from the bottoms of the pans. The deflectors serve to throw the water to the outer walls of the pans, whereby it comes into more direct contact with the heat.

Below the lowermost pan or receptacle 9ᵇ is a gas-burner consisting of a perforated coil 16, connected by a pipe 17 with a gas-supply.

The outer cylinder 1 is protected by a casing 18, of asbestos or other heat-resisting material, and an outer casing of wood 18ª, secured by metal hoops or bands 19.

The flue 3 is provided with a valve or damper 20, pivotally secured within the flue and provided with a rod or handle 21, which extends through the flue, to be manipulated from the outside to regulate the draft.

The operation of the apparatus will be apparent to those skilled in the art to which the invention relates from the foregoing description, in connection with the drawings, and may be briefly described as follows: The water enters through the pipe 5 and passes into the space between the cylinders 1 and 2, from whence it enters the coil 7 through the inlet 6 and rises to the upper end of the coil, from which it is discharged into the upper pan 9. The burner 16 being lighted heats the interior of the cylinder 2, so that the water receives an initial or preliminary heating as soon as it enters the inlet 5, which is continued as the water passes to and through the coil. The partly-heated water then descends, passing over the deflectors 12. The circuitous course of the water directed by the deflectors, as above described, and the pipes 11, which are all heated from the burner 16, effects a thorough heating, so that when the water reaches the discharge-pipe 10 it is heated to a sufficiently-high temperature for all purposes desired.

The apparatus may be located at any point desired within a dwelling or other building, so as to be conveniently accessible for any purpose.

The only outlet of the water being through a pipe in the center of the deflector in the lower pan it will be seen that the hottest water must at all times be delivered.

The inlet-pipe 5 of the apparatus is connected with a hydrant, and the water is thus heated in current and delivered through insulated pipes to any part of the building. Thus one of these heaters will supply any number of bath-tubs and the water may be distributed to any part of a dwelling with the full hydrant force.

I preferably support the apparatus upon feet or legs 21.

It will be noted that the heater as a whole is portable and may be utilized for a variety of purposes.

The feet or lower ends of the legs projecting from the lower pan are detachably secured by screws to the annulus 4, so that the pans and heating-coil may be inserted and removed through the bottom of the casing.

I claim—

1. A water-heater comprising a cylinder composed of inner and outer casings, a series of intercommunicating pans within the cylinder, a coil communicating with the space between the casings and with the upper pan, means for supplying water to the cylinder and heating means below the heater.

2. In a water-heater, the combination with a cylinder comprising an inner and an outer casing, of a water-supply pipe for delivering water between the casings; a coil within the cylinder communicating with an outlet in the inner casing; a series of pans or receptacles arranged within the cylinder, and connected by water-pipes; a deflector within each of said pans, and a burner below the lower pan.

3. A heater comprising a water-jacket, an internal series of superimposed intercommunicating receptacles, a coil intermediate of the jacket and receptacles, and communicating with the water-jacket at its bottom and with the upper receptacle, a discharge-pipe leading from the lower receptacle, heating means below the heater and means for supplying water to the water-jacket.

4. A heater comprising a water-jacket and supply-pipe, a coaxial series of intercommunicating internal receptacles, each provided with a deflector intermediate of its inlet and outlet, a coil surrounding the several receptacles and communicating with the water-jacket and with the upper receptacle, a discharge-pipe communicating with the lower receptacle below its deflector, means for supplying water to the jacket and heating means located below the lower receptacle.

5. A heater comprising a series of superimposed intercommunicating receptacles, each provided with a deflector intermediate of its inlet and outlet, means for supplying water to the upper receptacle above its deflector, an outlet-pipe communicating with the lower receptacle through an aperture in its deflector, and heating means.

6. A heater comprising a receptacle having an inlet at its top and a deflector therebelow and a discharge-pipe communicating with the space below the deflector through an aperture therein.

In testimony whereof I affix my signature in presence of two witnesses.

ROBERT S. LAWRENCE.

Witnesses:
HENRY E. COOPER,
R. W. F. OGILVIE.